(12) United States Patent
Kao

(10) Patent No.: US 6,768,341 B2
(45) Date of Patent: Jul. 27, 2004

(54) SYNCHRONIZING INTERFACE DEVICE FOR COMPUTER FACILITIES

(75) Inventor: Jesse Kao, Hsin Chuang (TW)

(73) Assignee: Global Sun Technology Inc., Taipei (TW)

( * ) Notice: Subject to any disclaimer, the term of this patent is extended or adjusted under 35 U.S.C. 154(b) by 15 days.

(21) Appl. No.: 10/253,167

(22) Filed: Sep. 20, 2002

(65) Prior Publication Data

US 2004/0056684 A1 Mar. 25, 2004

(51) Int. Cl.[7] .......................................... H03K 19/0175
(52) U.S. Cl. ............................. 326/93; 326/62; 716/61
(58) Field of Search ............................. 326/93, 95, 98, 326/62; 710/60, 61

(56) References Cited

U.S. PATENT DOCUMENTS 5,999,742 A * 12/1999 Richards et al. ................ 710/1
6,031,396 A * 2/2000 Hoshen et al. ................. 326/93

* cited by examiner

Primary Examiner—Daniel D. Chang

(57) ABSTRACT

A computer facility includes a synchronizing interface device coupled between a high and a low speed processing devices for allowing the processing devices having different operating speeds or velocities to be suitably coupled and communicated with each other without occurring errors. The synchronizing interface device includes a read/write device coupled between the high and the low speed processing devices, and a delay counting device coupled between the processing devices and the read/write device for suitably communicating between the high and the low speed processing devices.

4 Claims, 4 Drawing Sheets

SYNCHRONIZING INTERFACE DEVICE FOR COMPUTER FACILITIES

BACKGROUND OF THE INVENTION

1. Field of the Invention

The present invention relates to a synchronizing interface device, and more particularly to a synchronizing interface device for being coupled between and for communicating between computer facilities of computer system having different operating speeds or velocities.

2. Description of the Prior Art

Typical computer facilities, such as the personal computers, may include two or more processing circuits or devices, and may include one or more data buses and/or address buses coupled between the processing devices for communicating between the processing circuits or devices.

However, the processing circuits or devices of the computer facilities may include different operating speeds or velocities. For example, the central processing units (CPU) of the personal computers may include a low operating speed or velocity; and the other computer facilities, such as the personal computer memory card international association (PCMCIA) cards, the lineprinter (LPT) cards, the component object model (COM) ports, of the computer facilities may include a high operating speed or velocity.

It will be relatively difficult to communicate between the processing circuits or devices of the computer facilities that have different operating speeds or velocities. In addition, a great number of errors may be occurred between the processing circuits or devices of the computer facilities that have different operating speeds or velocities.

The present invention has arisen to mitigate and/or obviate the afore-described disadvantages of the conventional synchronizing interface devices.

SUMMARY OF THE INVENTION

The primary objective of the present invention is to provide a synchronizing interface device for being coupled between and for communicating between computer facilities of a computer system having different operating speeds or velocities.

In accordance with one aspect of the invention, there is provided a computer system comprising a high speed processing device, a low speed processing device, and a synchronizing interface device coupled between the high and the low speed processing devices, the synchronizing interface device including a read/write assembly coupled between the high and the low speed processing devices, and a delay counting assembly coupled between the high and the low speed processing devices and the read/write assembly for suitably communicating between the high and the low speed processing devices, and for allowing the processing devices having different operating speeds or velocities to be suitably coupled and communicated with each other without occurring errors therebetween.

The synchronizing interface device includes an AND gate coupled between the read/write assembly and the delay counting assembly.

The synchronizing interface device includes an AND gate having a first input coupled to the high speed processing device, and having a second input, and having an output coupled to the low speed processing device, and the synchronizing interface device includes an OR gate having an output coupled to the second input of the AND gate, a first input coupled to the delay counting assembly, and a second input coupled to the high speed processing device.

The high speed processing device includes a card wait port coupled to the first input of the AND gate, and the low speed processing device includes an information waiting port coupled to the output of the AND gate.

The high speed processing device includes an information selecting port coupled to the second input of the OR gate, and the delay counting assembly includes at least one delay counter having a clock port coupled to the first input of the OR gate.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
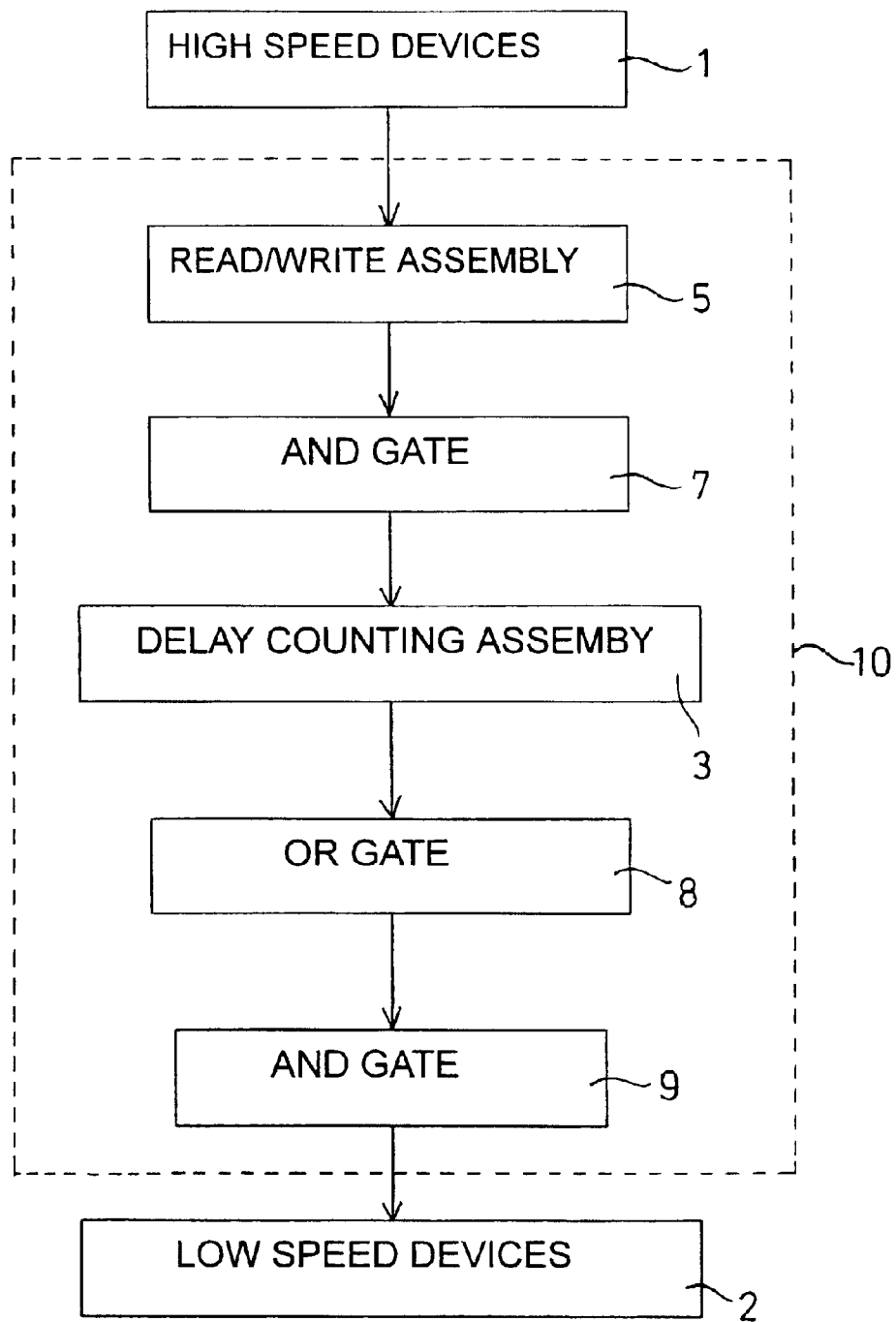
FIG. 1 is a block diagram of a synchronizing interface device in accordance with the present invention for being coupled between and for communicating between computer facilities of a computer system having different operating speeds or velocities.
Figure 2:
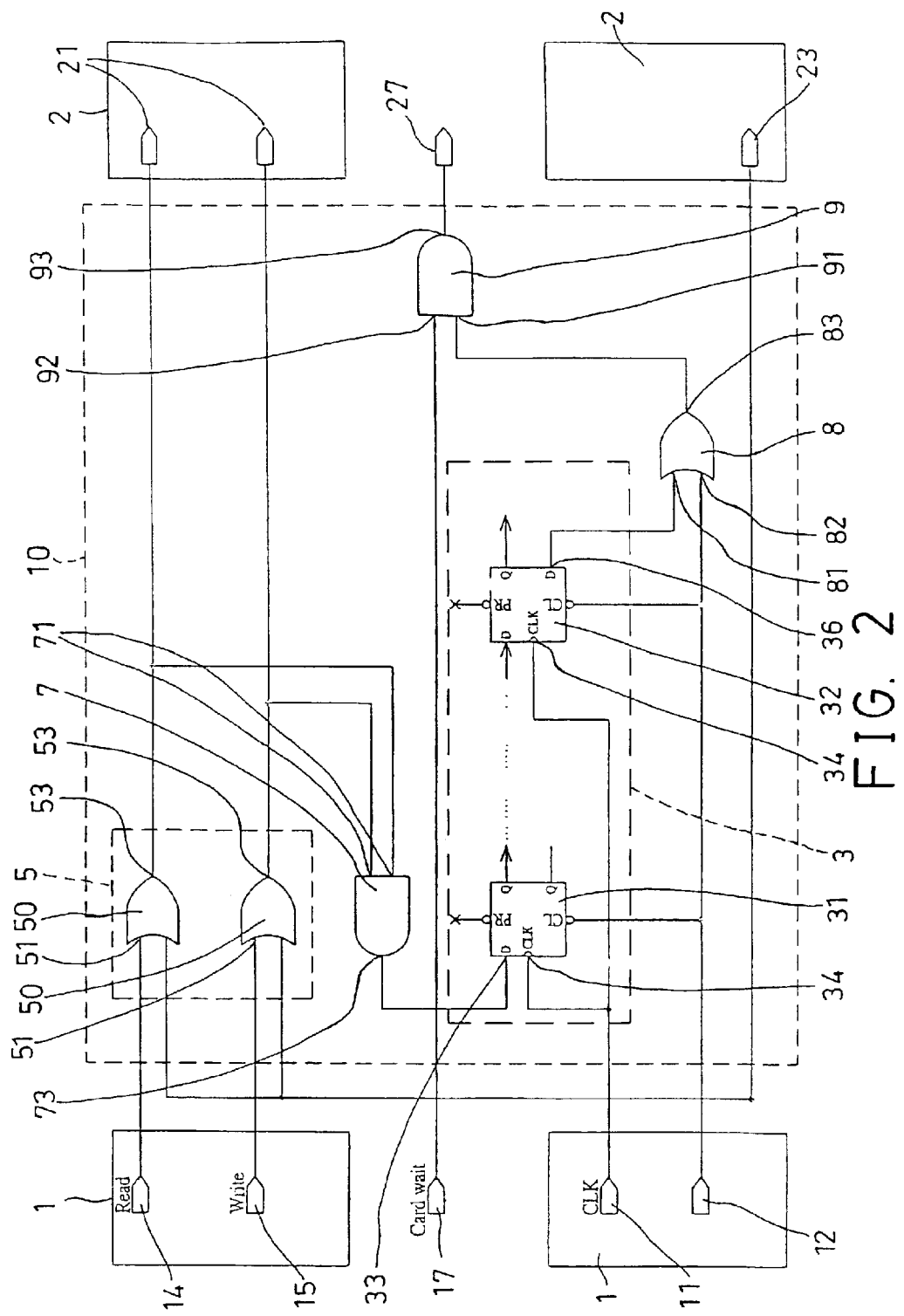
FIG. 2 is a plan schematic view illustrating the electric circuit of the synchronizing interface device.

Referring to the drawings, and initially to FIGS. 1 and 2, illustrated is a synchronizing interface device 10 in accordance with the present invention to be disposed or coupled between the processing circuits or devices 1, 2 of the computer facilities that have different operating speeds or velocities.

For example, the processing device 1 may be the computer facilities having a higher operating speed or velocity, such as the personal computer memory card international association (PCMCIA) cards, the lineprinter (LPT) cards, or the component object model (COM) ports. The other processing device 2 may be the computer facilities having a low operating speed or velocity, such as the central processing units (CPU) of the personal computers.

The synchronizing interface device 10 in accordance with the present invention comprises a delay counting assembly 3 including one or more delay counters 31, 32 coupled together in series. For example, the output of a previous delay counter 31 has an output coupled to an input of the following delay counter 32, as shown in dotted lines in FIG. 2.

A read/write intercepting or grabbing or obtaining or fetching or communicating assembly 5 includes one or more OR gates 50 having inputs 51 and outputs 53 coupled between the processing devices 1 and 2. For example, one of the inputs 51 of the OR gates 50 are coupled to the high speed processing device 1, such as the read/write ports 14, 15 of the high speed processing device 1.

The other inputs 51 of the OR gates 50 may be coupled to the low speed processing device 2, such as the read/write ports 21 of the low speed processing device 2. The outputs 53 of the OR gates 50 may be coupled to the other port 23 of the low speed processing device 2, for allowing the read/write information to be communicated between the high and the low speed processing devices 1, 2.

An AND gate 7 includes two inputs 71 coupled to the outputs 53 of the OR gates 50 and to the low speed processing device 2, and includes an output 73 coupled to one input 33 of the first delay counter 31, for actuating the delay counters 31, 32 of the delay counting assembly 3.

The high speed processing device 1 includes a clock (CLK) port 11 coupled to the clock (CLK) ports 34 of the delay counters 31, 32, for allowing the delay counters 31, 32 to be initialized or actuated by the CLK port 11 of the high speed processing device 1, and to provide an inverted or synchronizing pulse signal to the output 73 of the AND gate 7.

The outputs 36 of the last delay counter 32 or of all of the delay counters 31, 32 may be coupled to one input 81 of another OR gate 8 which includes another input 82 coupled to an information selecting port 12 of the high speed processing device 1 and also coupled to the delay counters 31, 32.

The OR gate 8 includes an output 83 coupled to one input 91 of another AND gate 9 which has another input 92 coupled to a card wait port 17 of the high speed processing device 1 for receiving the information from various cards. The AND gate 9 includes an output 93 coupled to an information waiting port 27 of the low speed processing device 2, such as of the CPU of the personal computers.

The output 93 of the AND gate 9 may be energized or actuated only when both the inputs 91, 92 of the AND gate 9 are energized or actuated. On the contrary, the output 93 of the AND gate 9 may be terminated when either of the inputs 91, 92 of the AND gate 9 is terminated.

In operation, when the read/write information between the high and the low speed processing devices 1, 2 may not be coupled or communicated or processed with each other, the information selecting port 12 of the high speed processing device 1 may issue or emit signals to the delay counting assembly 3 and then to the read/write communicating assembly 5, for preventing the read/write communicating assembly 5 from being directly communicated with the low speed processing device 2, and for allowing the high and the low speed processing devices 1, 2 only to be communicated or processed with each other via the delay counting assembly 3.

Similarly, when the read/write information between the high and the low speed processing devices 1, 2 may not be suitably coupled or communicated or processed with each other by the read/write communicating assembly 5, the read/write communicating assembly 5 may issue signals to the delay counting assembly 3 via the AND gate 7, in order to delay the communication between the high and the low speed processing devices 1 and 2. The delay counting assembly 3 may then issue signals to the input 81 of the OR gate 8 for signal comparing purposes.

The information selecting port 12 of the high speed processing device 1 may issue or emit signals to the other input 82 of the OR gate 8. The output 83 of the OR gate 8 may be energized to actuate or to send signals to the input 91 of the AND gate 9 when either the delay counting assembly 3 sends out signals to the input 81 of the OR gate 8, or the information selecting port 12 of the high speed processing device 1 sends signals to the other input 82 of the OR gate 8.

Figure 3:
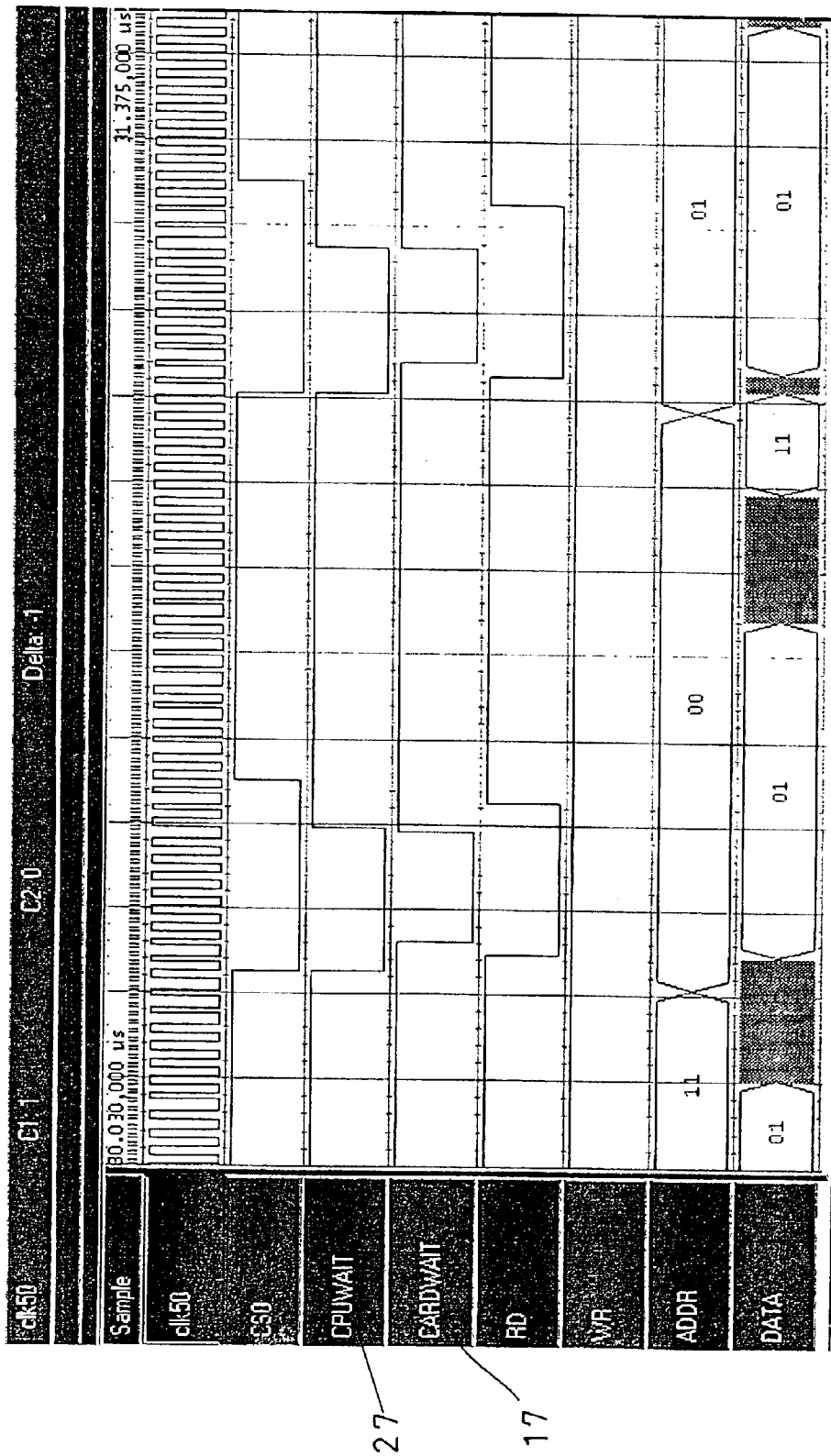
FIGS. 3 and 4 are schematic views illustrating the charts or the wave forms generated by the synchronizing interface device.
Figure 4:
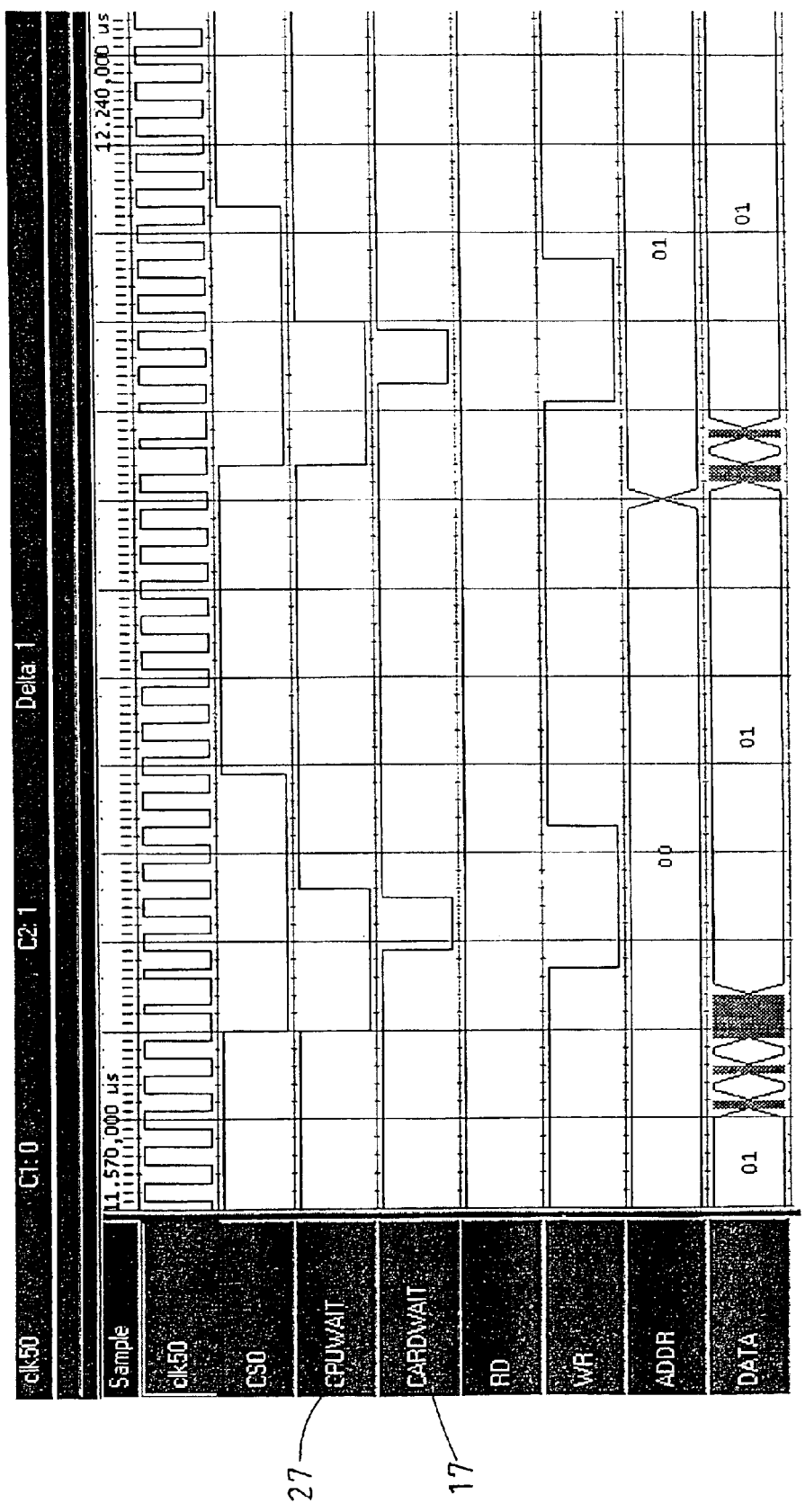

The delay counting assembly 3 of the synchronizing interface device 10 in accordance with the present invention may thus be provided for delaying the number of clocks (CLKs) between the high and the low speed processing devices 1 and 2, particularly between the card wait port 17 of the high speed processing device 1 and the information waiting port 27 of the low speed processing device 2, as shown in FIGS. 3 and 4, for allowing the processing circuits or devices 1, 2 of the computer facilities that have different operating speeds or velocities to be suitably communicated with each other without occurring errors therebetween.

Accordingly, the synchronizing interface device in accordance with the present invention may be coupled between the computer facilities having different operating speeds or velocities, for suitably communicating between computer facilities having different operating speeds or velocities.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A computer system comprising:
   a high speed processing device,
   a low speed processing device, and
   a synchronizing interface device coupled between said high and said low speed processing devices, said synchronizing interface device including a read/write assembly coupled between said high and said low speed processing devices, and a delay counting assembly coupled between said high and said low speed processing devices and said read/write assembly for suitably communicating between said high and said low speed processing devices, and said synchronizing interface device including an AND gate having a first input coupled to said high speed processing device, and having a second input, and having an output coupled to said low speed processing device, and said synchronizing interface device including an OR gate having an output coupled to said second input of said AND gate, a first input coupled to said delay counting assembly, and a second input coupled to said high speed processing device.

2. The computer system according to claim 1, wherein said synchronizing interface device includes a second AND gate coupled said read/write assembly and said delay counting assembly.

3. The computer system according to claim 1, wherein said high speed processing device includes a card wait port coupled to said first input of said AND gate, and said low speed processing device includes an information waiting port coupled to said output of said AND gate.

4. The computer system according to claim 1, wherein said high speed processing device includes an information selecting port coupled to said second input of said OR gate, and said delay counting assembly includes at least one delay counter having a clock port coupled to said first input of said OR gate.

* * * * *